United States Patent [19]

Briggs et al.

[11] 4,313,417
[45] Feb. 2, 1982

[54] PORTABLE SPACE HEATER

[75] Inventors: Eugene C. Briggs; Robert F. Shaftner, both of Bowling Green, Ky.

[73] Assignee: Koehring Company, Milwaukee, Wis.

[21] Appl. No.: 56,014

[22] Filed: Jul. 9, 1979

[51] Int. Cl.³ .......................... F24H 3/02; F24H 1/00
[52] U.S. Cl. ............................... 126/110 B; 432/222
[58] Field of Search ............ 126/110 B, 110 C, 61 D; 432/222, 223, 224

[56] References Cited

U.S. PATENT DOCUMENTS

| | | | |
|---|---|---|---|
| 3,256,003 | 6/1966 | Briggs | 126/110 B |
| 3,319,947 | 5/1967 | Truesdell | 432/223 |
| 3,645,512 | 2/1972 | Dent et al. | 432/223 |
| 3,779,229 | 12/1973 | Volbehr | 126/110 B |
| 3,794,461 | 2/1974 | Brazee | 432/222 |
| 4,081,238 | 3/1978 | Briggs et al. | 432/222 |
| 4,089,642 | 5/1978 | Briggs et al. | 126/110 B |

Primary Examiner—Albert W. Davis
Assistant Examiner—Wesley S. Ratliff, Jr.
Attorney, Agent, or Firm—Jerome P. Bloom

[57] ABSTRACT

A portable heater comprising a housing composed of separate parts including a lower part having a bottom and side wall portions defining a trough, components of said heater including a combustion chamber assembly and a support, said support positioning in a sense transverse to said lower part, said combustion chamber assembly and said support having in connection therewith means for seating to and interfitting with means in connection with said side wall portions of said lower part in a drop fit thereof to said lower part, said support mounting thereon a motor and a fan blade assembly for powering said heater and developing therein a pressured flow of air to and about said combustion chamber assembly and means for delivering fuel and igniting the fuel in delivery thereof to the combustion chamber of said assembly, said interfitting means being constructed and arranged to position said combustion chamber assembly and said support and said fan blade assembly in a substantially direct alignment on and within said lower part of said housing and to inhibit relative longitudinal and lateral motion therebetween.

29 Claims, 6 Drawing Figures

PORTABLE SPACE HEATER

BACKGROUND OF THE INVENTION

This invention relates to improvements in portable space heaters making them more economical to fabricate, more rugged in construction, easier to assemble and maintain, quieter in operation and more efficient and satisfactory in use.

An ever present problem in the fabrication of portable heaters is the cost of material, parts and their assembly. Parts as heretofore fabricated have demanded careful fit and even then their consistent and proper fit on a production basis has been difficult to maintain. The form of the parts and their relatively poor interrelation have not only introduced excess cost factors in their production but have many times resulted in unnecessary and objectionable noise and vibration in their use. Apart from this, the application of air to support combustion in such heaters has not been as efficient as one might desire. Further problems have stemmed from lack of constructional integrity in portable heaters which has at times led to inadvertent damage by reason of rough handling. It was to overcome problems such as this that efforts were applied which resulted in some unexpectedly advantageous improvements forming part of the present invention.

The portable heater art has been developed and explored over a period of many years and applicants are conversant with a considerable portion of the prior art. However, applicants cannot point to any prior art which comes to their mind as specifically pertinent to the particular improvements of the present invention. Nevertheless, by way of reference as to the point of development of the heaters of the type herein illustrated, they note U.S. Pat. No. 4,089,642.

SUMMARY OF THE INVENTION

Embodiments of the present invention feature the use of parts which are so fabricated and arranged to have component sub-assemblies and parts drop fit, one relative the other, to be simply fixed in place, commonly, using a minimal number of easily applied and removed conventional fasteners.

In the exemplary embodiment illustrated the heater is provided with a rugged tubular housing which is hexagonal in cross section and comprised of mating halves having abutting external flange portions in a medial longitudinal plane of their composite. The flange portions on the lower half include laterally aligned and longitudinally spaced pairs of notches. These notches define and establish anchor positions for a drop fit combustion chamber assembly and a strap. The latter statically and dynamically mounts and balances a motor-compressor and transformer assembly used in powering the heater and its fuel supply system. The motor drive shaft mounts a fan blade assembly for furnishing that supply of air needed to support combustion, to maintain the heater efficiency and safety and keep the heater exterior at a safe temperature.

The simplicity of the assembly and its efficiency in operation is further enhanced by a drop fit shroud for the fan blade assembly which contains, channels and preserves the force effects of air flow developed in the fan operation and applies it for its maximum and most effective use.

The heater arrangement is such that the flanges on the lower half shell of its housing define the mount and establish the position of its operative parts.

The housing is supported on saddle shaped brackets mounted on the top of the fuel tank which defines its base which are so configured so to add strength and stability to the housing. These brackets serve to support hooked-on plates which protect yet lend easy access to heater components which must be reached in maintenance procedures. An incidental but important feature is found also in the improved positioning of its fuel delivery line.

It is therefore a primary object of the invention to provide a portable heater which is economical to fabricate, quieter in operation and more efficient and satisfactory in use.

An additional object is to provide a portable space heater having a more rugged construction which nevertheless is rapidly assembled and disassembled.

Another object is to provide an improved housing construction affording a drop fit mount of its component sub-assemblies and its parts which automatically positions the same in their required relation.

A further object is to provide a balanced mount for a motor-compressor-transformer assembly which permits torsional motion to dampen vibration caused by the motor, resulting in a quiet heater operation.

A further object is to provide a portable space heater and an interrelation of component parts thereof and the design of such parts presenting the advantageous structural features, the inherent meritorious characteristics and the means and mode of use described.

With the above and other incidental objects in view as will more fully appear in the specification, the invention intended for coverage by Letters Patent consists of the features of construction, the parts and combinations thereof, and the mode of operation as hereinafter described or illustrated in the accompanying drawings, or their equivalents.

Referring to the drawings, wherein one but not necessarily the only form of the embodiment of the invention is illustrated.

Like parts are designated by like numerals throughout the several views.

The base of the preferred embodiment illustrated is a relatively shallow rectangular fuel tank 10 the length of which is substantially greater than its width. The tank 10 has a peripherally encompassing external flange 12 in a medial horizontal plane to facilitate its handling and four rectangularly positioned integrally formed feet 14 which provide a stable mount thereof and serve to elevate the bottom of the tank from the ground surface. The rear extremity of the top of the tank incorporates its filler opening, which has a screw type cap 16. The tank has a further opening at its top, between its lateral extremities adjacent one side and intermediate its ends, in which is plug fit a resilient sleeve 18 on a fuel delivery adapter tube 20 embodying a filter. The dependent extremity of tube 20 extends into the tank to position its inlet adjacent to but spaced from the tank bottom.

Fixed and projected perpendicular to and spaced longitudinally of the top of the tank 10 are transversely disposed plate-like brackets 22. The upper edges of brackets 22 are contoured to produce therein depressions of trapezoidal configuration, which depression are in a directly aligned relation to nest therein and have suitably secured thereto the bottom portion of a tubular housing 24 which is hexagonal in cross section. The housing 24 is a shell formed in two longitudinally extending halves 26 and 28.

The bottom half 26 of housing 24 has the configuration of a trough open at its ends and defining a longitudinally extending cavity which is uniformly trapezoidal in cross sectional configuration. It consists of a rectangular base portion 30 and equally rectangular divergent side portions 32 which extend upwardly and outwardly from the lateral extremities of the base to terminate in outwardly directed co-planar flanges 34 parallel to the plane of the base. The flanges 34 are each provided with an identical series of three longitudinally spaced rectangular notches 36, 38 and 40, the notches 36 and 38 of which are equal in length and the notches 40 of which are longer. Thus arranged, the notches are provided in laterally aligned, longitudinally spaced pairs. The notches 36 and 40 are respectively adjacent and spaced from the respective ends of the flanges and the notches 38 are located intermediately thereof.

The top half 28 of the housing has the same general configuration as the half 26 except that it is inverted and differs as to the formation of its flanges. To simplify reference, comparable parts of the upper half are identified by the same numerals as applied to the lower half, bearing, however, "prime" symbols. Thus, in the upper half 28 its base 30' defines its top while its sides 32' diverge downwardly therefrom to terminate in longitudinally co-extensive flanges 34'. The flanges 34' are co-planar but differ from the flanges 34 in that they have no notches and are somewhat wider and have at their outer extremities longitudinally co-extensive, right-angled, flange-like extensions 35 which depend therefrom. The arrangement is such that as the inverted top half 28 is superposed over the bottom half 26, in the eventual completion of the housing, the flanges 34' will co-extensively overlie the flanges 34 and their right angled dependent flange-like extremities will position over the outermost edges of flanges 34 to contain what is disposed therebetween. The import of this will soon be obvious.

The heater includes a combustion chamber assembly 50 the outer wall of which is formed by a cylindrically configured tubular shell 52. Positioned within and in concentrically spaced relation to the shell 52 is a tubular member 54 defining the peripheral wall of a combustion chamber 56. The outermost end of the member 54 is bridged by a suitably fixed plate 58 forming the discharge end of the combustion chamber. The discharge from the combustion chamber passes through a central aperture in the plate 58 rimmed by a forwardly convergent flange opening to the base of a conically and outwardly convergent cone-like cavity defined by a plate 62. The plate 48 has circumferentially spaced bracket-like projecting fingers 59 which extend to be secured to the inner wall of the shell 52 to maintain its concentric spaced relation in reference to the member 54 and at the same time to have secured thereto circumferentially spaced co-planar fingers at the skirt of the plate 62. The plate 62 defines a conical afterburner chamber wherein any unburned elements of fuel normally contained in the discharge from the combustion chamber are burned prior to escape from the combustion chamber assembly by way of apertures defined at the periphery of the base of the afterburner chamber. The inner end of the shell 52 is bridged by a plate 66 having a central aperture defining the inlet to the combustion chamber. The plate 66 has in connection therewith a burner head 67 exposing the discharge end of an aspirating type fuel atomizing nozzle 68 to this inlet opening. As schematically illustrated the nozzle 68 has at its receiving end adaptors 72 and 74 to which may be respectively connected a line 73 for delivery thereto of air under pressure and a line 75 for delivery thereto of fuel.

The combustion chamber assembly is not shown or described in any detail since the internal arrangement and the character and nature of the parts may somewhat differ. The important construction demonstrated is that in accordance with the present invention the entire sub-assembly 50 may be precisely located and mounted in the heater housing by means of four hook-like brackets 78 on the outer surface of and fixed in connection with the shell 52. The brackets 78 are arranged in longitudinally spaced relation to opposite sides of the shell 52, at the lateral extremities of a diametral plane thereof. The brackets 78 are thus arranged in laterally spaced pairs the positions of which are in correspondence with the spacing between notches 36 and 38 in the flanges 34. The brackets 78 comprise plate portions 79 which are co-planar, having bent over dependent right angled extremities 80, giving them right angled hook-like configurations. Their size, shape and configuration is such that they may be superposed over the portions of flanges 34 to have the dependent extremities 80 align with notches 36 and 38 and be dropped therethrough as the combustion chamber assembly is applied in the trough defined by the lower half of the heater housing. The longitudinally spaced sides of the notches 36 and 38 establish the positions of the bracket portions 79 and 80 and prevent shifting thereof in a sense longitudinally of the heater housing. The dimensions and arrangement of the dependent extremities 80 with reference to the inner or base edges of the notches prevent lateral shifting of the assembly 50.

Thus, the combustion assembly need only be dropped into place as defined by the notches 36 and 38 and for all intents and purposes be positioned as required for assembly in and proper operation of the heater.

The other essential subassembly of the heater is based on a longitudinally extended, rectangular, relatively narrow strap 90 formed of sheet metal. In assembly, this strap is applied transversely of and in bridging relation to the lower half 26 of housing 24, at the location of the transversely aligned notches 40. Viewing the strap 90 in its bridging relation to the housing, a central portion thereof is formed to define at its upper surface a generally trapezoidal pocket 92 centered between and spaced from its ends. The pocket base 91 has a central portion offset upwardly thereof. This offset central portion includes short upwardly directed slightly convergent sides bridged by a concavely configured strap segment formed on a uniform radius the center or lowermost point of which is in a plane which includes the vertical plane of the central longitudinal axis of the heater housing. This central concave strap portion 94 has two apertures which when the strap is assembled in the heater housing are spaced longitudinally thereof. These apertures have slip fit therethrough the longitudinally spaced mounting studs projected from the bottom of a motor 98 drivingly related by its shaft 100 at one end to the rotor of a connected compressor unit 104 and at the other end to a fan blade assembly 106. Nuts threaded on the studs 96 serve an obvious manner to fix the motor 98 in connected relation to the concave strap segment 94. Spaced equidistantly to either side of the apertures receiving the studs 96 the concave segment 94 includes an aperture through which is thrust the dome-shaped expanded head 108 on one end of the pin like body of a resilient bumper support 110 for the motor and its connected parts. An expanded head at the opposite end of the bumper support serves to adhere, together with the base of the dome shaped end to opposite surface portions of the strap segment 94 through which the bumper is thrust. The arrangement is such to resiliently and dynamically balance the motor and its connected parts on the strap 90, an in connection with the housing 24, as will be seen.

The forming and stamping of the strap 90 provides the base portion 91 of the pocket 92 with a blanked out tab 112 spaced equidistantly to either side of its center. The tabs 112 are bent to depend below the strap 90 and perpendicular to its lowermost surface. The tabs 112 serve as abutments for correspondingly dependent tabs formed on a plate 114 applied to the bottom of the base 91 and across the space defined by its offset portion. The plate 114 is fixed to the strap 90 by bolts and nuts the application of which is accommodated by aligning apertures both in the abutted tabs and the body of the plate 114 and the base 91, through which are applied bolts and nuts to provide a firm support for a transformer 116 connected in a suspended relation to the plate 114 and in a vertical spaced alignment with the motor 98.

The portion of strap 90 which defines a trapezoidal pocket has a width less than that between the side walls 32 of the housing half 26. The uppermost edges of the divergent side portions of the pocket 92 are respectively laterally extended by integral strap portions 118. These strap portions 118 are co-planar, oppositely directed and have turned down portions at their outer extremities defining thereon right angled hook-like flanges 120. As will be seen, in the application of the strap 90 which has in connection therewith the motor, compressor and fan assembly and the necessary transformer, it need merely be drop fit to partially nest in the lower half of the housing 24 with the outer extremities of the strap portions 118 seating over the flanges 34 at the location of the notches 40, whereupon the hook-like extremities 120 position within the notches 40 to overlie the base edges thereof and be confined by their sides.

Thus, simply by virtue of the brackets 78 and the hook-like extremities 120 on strap 90 the essential subassemblies of the heater may be drop fit to partially nest in the trough of the lower housing half 26 in a substantially precisely aligned and spaced relation with respect to their operative parts.

Each of the flanges 34 and 34' is provided with three apertures, identically positioned and identically spaced, two apertures 122 of which are respectively adjacent their respectively opposite ends and beyond the notches 36, 38 and 40. The third aperture 124 is located in each flange between the notch 40 and the notch 38, more closely adjacent the notch 38.

Prior to the mounting of the combustion chamber 50 and the strap 90 and the structure which mounts thereon, there is drop fit on and in the lower half of the housing 24 a hemi-cylindrically configured plate structure 126 which nests concentrically within and in closely spaced relation to the half 26. Included at each of the uppermost lateral extremities of the plate 126 is a radial and outwardly projected flange 128. The outermost extremity of each flange 128 is bent downwardly at right angles thereto to provide thereon a hook-like extension 130. The flanges 128 are in the diametral plane of and coextensive in length with the member 126 except for a rectangular cut-out 132. In the drop fit of the member 126 to the lower half of the heater housing its flanges 128 and their hook-like extremities seat on and overlap the flanges 34 and the notches 132 thereof are positioned to center within the bounds thereof the respective apertures 124. An apertured friction clip 134 is applied to each flange 34' to have its apertures align with the aperture 124 in the flange. As will be seen, the friction clip 134 in each case fills the notch 132 and serves in the assembly procedure to limit displacement of the member 126 in a sense longitudinally of the heater housing.

Once the member 126 is in place by reason of its drop fit in the housing half 26, the combustion chamber assembly 50 is then drop fit in a manner previously described, a procedure which positions what constitutes the inlet end of the combustion chamber assembly and its connected parts within and in slightly spaced relation to and concentrically with the member 126. At what may be considered its forwardmost end, which overlaps the inlet end of the assembly 50, the member 126 is rimmed by an internal flange 138 the radially innermost edge of which is in very closely spaced concentric relation to the outer shell 52 of the assembly 50.

After the combustion chamber assembly is drop fit, the strap 90 is drop fit to place the components attaching thereto in line with and the fan blade assembly 106 thereof most adjacent the assembly 50. It will be seen from the drawings that the fan blade assembly is then coaxial with the combustion chamber and relatively adjacent but spaced from the inlet end of its nozzle 68.

Compressed air, under pressure, is provided for the nozzle by application of a flexible tube defining the line 73, which connects at one end to the outlet of the compressor unit 104 and has its other end slip fit to the nozzle adapter 72. The line 75 has its respective ends slip fit to the adapter 74 and the fuel delivery tube 20, to provide a flow path therebetween for the fuel drawn to the nozzle 68 from the tank 10. The application of accessary elements and electrical connections which must be made are made at this point in the assembly.

Such connections and elements as are necessary to the circuitry required for energizing of the motor 98 and ignition of the delivered fuel are neither shown nor described since the same is well understood and may be very easily contrived by those versed in the heater art.

The drop fit of parts one to the other as above set forth and the suitable application of the electrical wiring and connections for energizing the heater unit having been achieved, there is then applied over and in mating relation to the member 126 a second hemi-cylindrical member 126' of similar length and formed on a similar radius. The member 126' is inverted relative the member 126 and has at its lateral extremities and in its diametral plane radially projected flanges 128' each including a notch 132' in an arrangement which is identical with that of the flanges 128 and the notches 132. A difference occurs in the construction of the member 126', however, in that its arcuate wall structure is extended beyond its diametral plane at the inner edge portion of each notch 132' to form a rectangular dependent tab 150. The member 126', in the application thereof, is superposed directly over the member 126 to have its flanges 128' seat to and coextensively with the flange portions 128 as notches 132' register in alignment with notches 132. In this process the tab-like extensions 150 pass through the notches 132 immediately of their innermost edges to frictionally adhere to the outer surface of the member 126 in a manner believed obvious. The slip fit relation of the parts is believed clear. The arrangement provides that an internal flange 138' on the forwardmost end of the part 126' encompasses the inlet end of the assembly 50 to join with and become an extension of the identical flange 138 on the member 126 to define therewith a very limited annular opening about the member 52.

The members 126 and 126' thus define a shroud within and spaced forwardly of the rearmost end of which is positioned the fan blade assembly 106 the outer tips of the blades of which almost touch its inner wall surface. The forward end of the shroud nests and its flange 138, 138' almost touches the inlet end of the assembly 50 which is circumscribes. The shroud so provided leaves a very limited annular passage for the air flow developed by the fan to move in part about and longitudinally about the shell member 62. At the same time by reason of the shroud and its position a static pressure condition is set up forwardly of the fan blades to insure a maximal and uniform flow of air under pressure to and about the combustion chamber. The energy developed is utilized to a maximum in this respect.

With the parts applied in place and established in their operating condition as described, the inverted upper half 28 of the housing 24 is applied to cap the structure drop fit in and to the lower housing half 26. As this occurs, the flanges 34' on the upper half completely superpose the flanges 34, the notches therein, the brackets 78, the superposed flanges 128 and 128', the applied friction clips 134 and the ends of strap 90 including their hook-like extensions 120 and seat thereto to fully cap the same. All parts are fixed in place by the simple application of three bolts through the apertures 122 and 124 in the flanges 34 and 34', which vertically align, as well as the apertures of the friction clips 134 to join and lock together the flanges 34 and 34'. Nuts are applied to the bolts thereby to clamp between these flanges the interposed parts.

There is slip and friction fit to fill the rear end of the housing 24 a hexagonal grill 152 having a central opening rimmed by a ring-like structure 154. Projecting from the inner surface of the ring 154 is a series of four rectangular circularly spaced tits 156 which frictionally fit about the rear end of the compressor unit 104.

Figure 6:
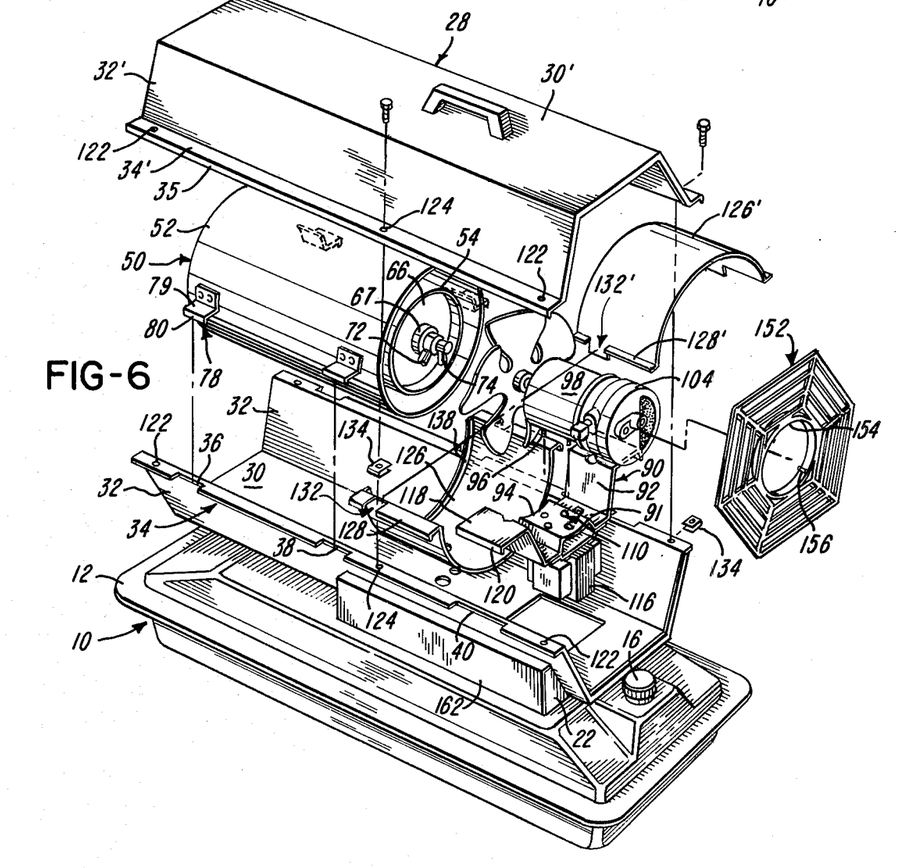
FIG. 6 is an exploded perspective view.

The construction features of the parts of the portable heater above described as well as the mode of their assembly enable the attainment of the various objectives of the invention in a most desirable fashion. Once the lower half 26 of the heater housing is positioned in and fixed to the saddle defined by the plate-like brackets 22, to have its rearmost end adjacent but forward of the cap 16 while its forwardmost end extends to the opposite end of the tank, and in somewhat vertically spaced relation thereto, one may then apply the operative units of the heater in a simple and quick fashion. As will be obvious, particularly from FIG. 6 of the drawings, the combustion chamber 50 may be easily and quickly controlled by the position of the notches 36 and 38. With no effort save for alignment the hook-like extremities of the four brackets 78 drop fit in the notches 36 and 38 in the flanges 34. The combustion chamber assembly 50, as noted previously, may be of any composition but by way of example may be basically of parts similar to those seen in the referenced patent of the prior art, the differences being that there is no need for welding, riveting or other wise of the combustion chamber assembly per se to establish a connected relation thereof to the heater housing. Nor need there be a difficult manipulation to maintain a required spacing of the assembly from the inner wall of the heating housing. Everything is predetermined and accomplished precisely in the drop fit. The brackets 78 serve very adequately to firmly support the combustion chamber assembly and orient the fuel nozzle as and how required. Similar benefits are found in the mount of the support strap 90 to have its hook-like extremities 120 bear on and over the portions of the flanges 34 including the notches 40 and to project inwardly of the notches. Again, the parts mounted to the strap 90 are precisely positioned. Added to this is the fact that the shroud for the fan, which establishes a predetermined and important control of air flow in the heater, particularly its lower portion, is also drop fit in and its flanges 128 are supported by the flanges 34 of the lower half of the heater housing between the notches 38 and 40. The flanges 128' are drop fit onto flanges 128. Then, by simply dropping the upper half of the heater housing over the lower half, flanges 34' will seat over, contain and clamp those portions of the brackets 78, the outer extremities of the strap portions 118, and superposed flanges 128 and 128' to the flanges 34 as releasable connector bolts are applied to interconnect the flanges 34 and 34' and thereby the upper half of the housing to the lower half. By such simple procedure and means everything is fixed and locked in place. The arrangement leaves no room for misalignment or poor connection of the parts to their supports or to the housing. This balanced suspension of all the parts contributes significantly to a better and quieter operation of the heater. And with all this the housing seals about the operating components except at its respective ends, through one end of which the compressor and the fan blade assembly draw the required air in a uniform manner and through the other end of which is delivered heated air and the relatively clean products of combustion. The grill 152 is not only protective but lends balance and an essence of dampening to the compressor and its attached parts, though it may be dispensed with without detracting from the benefits of the otherwise significant features of the invention.

Particular attention must be directed to the shroud 126, 126' and the nature of its position and application about the fan blade assembly 106 and the assembly 50. First, slip fit of the part 126' produces a friction grip of the arced tabs 150 about the body of the member 126 which lends the shroud assembly so formed a unitary character as the superposed flanges 128 and 128' are clamped in place. Secondly, in positioning thereof the shroud defines a chamber 160 about and forwardly beyond the fan blade assembly which controls the flow of air developed thereby to a significant degree when the motor unit 98 is energized. To understand the control, one must appreciate that there are three limited outlets from the chamber 160. Also while the operating fan draws air from the inlet end of the chamber 160, by reason of its radial extent, almost touching the shroud, while it rotates, it substantially forms an essentially blocked chamber portion forwardly thereof where the air flow developed thereby builds up a head of static pressure. One outlet is defined by the very limited annular opening provided by the flanges 138, 138' being in a closely adjacent encircling relation to the member 52, with reference to the inlet end of the assembly 50. The second outlet is the limited annular entrance opening to the space between the members 52 and 54 at the inlet end of the combustion chamber. The third outlet is provided by a plurality of openings in the periphery of the burner head 67 which in this case may be of the type shown in U.S. Letters Pat. No. 3,256,003. In this last respect, the burner head has a series of tangential inlets communicating with the chamber 160 which lead to pockets defined in the operating face of the burner head which open in turn both from the operating face and to an area immediately about the nozzle 68. With this in mind, by virtue of the fit and positioning of the shroud to contain the fan blade assembly 106, immediately in line with and to the rear of the nozzle 68, one may upon operation of the fan blade assembly develop a pressured flow of air forwardly of the fan which faces limited areas of outlet. The result of this is a buildup of static pressure forwardly of the fan blade assembly which is effectively uniformly maintained at a desired level to produce a forceful and generally uniform thin layer flow of air over the surface of the member 52. At the same time, there is a uniformly pressured flow of air through the space between the members 52 and 54. Thirdly, the pressure established in the chamber 160 insures that the air passing through the tangential inlets peripherally of the burner head and into the pockets in its operating face and about the nozzle is maintained at a relatively uniform level of flow and under a generally uniformly controlled pressure. The end result is that the air flow is relatively balanced as required to get optimal conditioning and heat transfer as between the combustion chamber and the air between the members 52 and 54 and at the same time a controlled temperature at the exterior of the combustion chamber assembly 50. This last insures that the exterior of the heater housing may be kept within a safe temperature and avoid inadvertent injuries to the user of a level which has been so often encountered heretofore in operation of prior art heaters. The uniformity of flow about the combustion chamber per se and in particular about the tubular member 54 thereof enables a controlled heat exchange, thereby to achieve a more uniform heat flow in the air passing from the heater to the environment which it is intended to maintain at a reasonable temperature. As a matter of fact, not only is the air flow and its control improved by reason of the shroud 126, 126' and particularly the arrangement and positioning of its complementary flanges 138, 138' but it has been found that the construction causes a buildup of a more uniform static pressure in the combustion chamber, the net result of which is a more complete combustion within such chamber. Thus, not only is there a drop-in feature to facilitate the fabrication, assembly and maintenance of a portable space heater but there is an improved air control, as far as that developed in the operation of the fan blade assembly 106, which lends itself to increased heater efficiency and safety in use.

Another important feature of the invention is found in the nature and character of the support strap 90 and the method by which it mounts the elements in connection therewith. The strap 90 mounts the motor unit and its connected compressor unit and fan blade assembly by means of two longitudinally aligned studs thrust through and connected to the dependent apex portion of the central concave portion 94 of the offset in the strap. The construction and arrangement of the strap together with this position of mounting of the motor unit and its connected structure provides a torsional vibration damping means. There is a spring effect of the mounting strap with the centering of the motor in a somewhat nested relation. The mass of the transformer mounted below the motor aids in damping the torsional vibration of the motor. The net result is a quieter operation of the heater and it eliminates the transmission of the 60 hertz pulses which are caused by the shaded pole motor conventionally employed. In effect, the motor is provided with static and dynamic balance on a spring element as defined by the strap 90 and its configuration. The provision of the bumper supports 110 is another feature to perserve and maintain the motor in its proper position, whereby to avoid undue stress on the parts due to vibration of the motor unit by reason of inhibiting uncontrolled movements thereof with reference to the strap and the heater housing.

The non-circular multi-sided character of the housing 24 disctates that it may be simply and economically provided as a sheet metal unit having a strong rugged construction. In the example illustrated and as preferred the cross section is hexagonal but this is not to be construed as limiting. The configuration of the housing and particularly the manner of its fabrication as described has lent substantially improved strength characteristics and protection of the contained components of the heater.

Other improvements indicated in the foregoing disclosure include the arrangement of the snap-in grill which not only is a readily applicable protection device affording easy access to the interior of the heater but also a further medium for lending stabilization to the heater motor in its operation.

Figures 1, 3, 4:
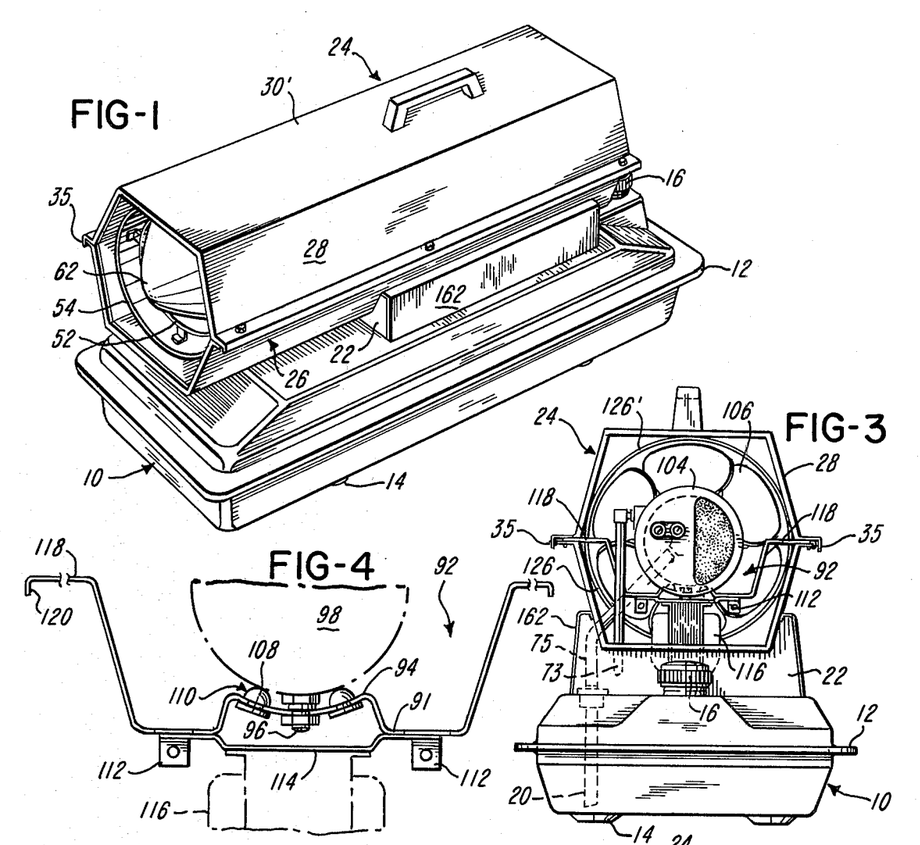
FIG. 1 is a perspective view of one embodiment of the invention.
FIG. 3 is a rear end view with the grill removed to illustrate the motor mount.
FIG. 4 is an enlarged fragmentary view showing further detail of the motor mount.
Figure 2:
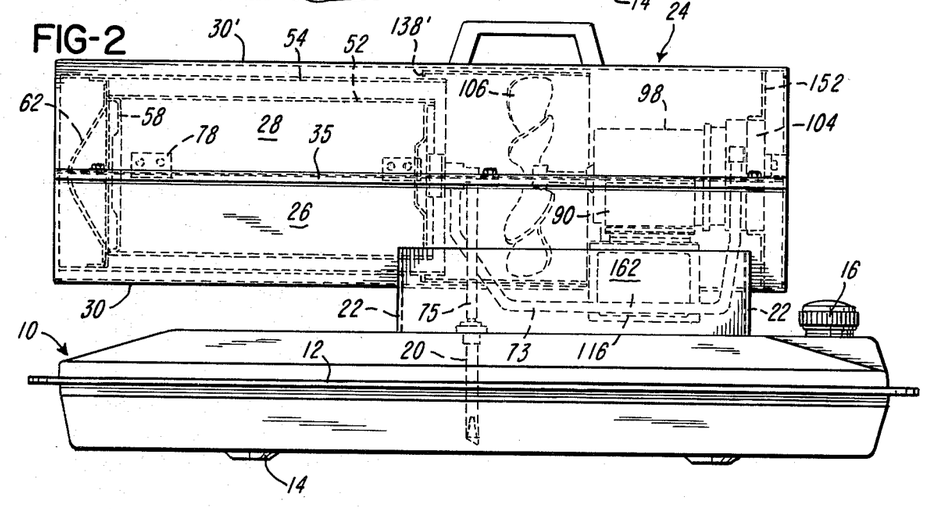
FIG. 2 is a side elevation.
Figure 5:
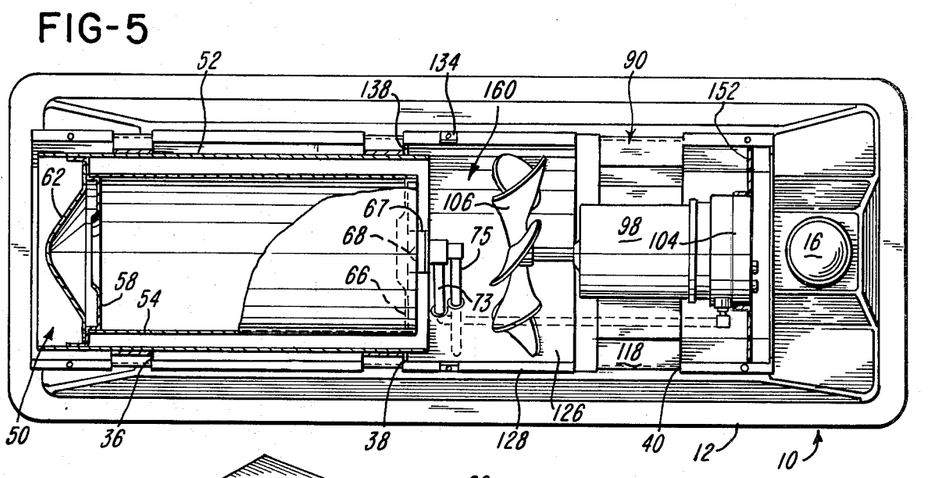
FIG. 5 is a top view with the upper half of the housing shell removed and parts shown partially in cross section.

An additional improvement of the invention is the positioning of the delivery tube 20 in connection with the tank 10 which embodies the filter assembly of the fuel delivery line. In accordance with the present invention this is moved off the center line of the heater and to a position to one side of the housing, as seen in FIG. 5. Referring to FIG. 3, the brackets 22 which support the housing 24 are bridged by hooked-on side plates 162. The side plates are comprised of portions which converge upwardly from the lateral extremities of the top of the tank 10 to which they seat and up and over the top lateral extremities of the brackets 22 to hook over them and into the trapezoidal pocket defined thereby and against the contained upwardly divergent side surfaces 32 of the housing 24. All one needs do to reach the filter assembly is to lift up and unhook the plate 162 to one side of the brackets 22 and there will then be exposed between the brackets and adjacent the side of the tank the fuel delivery line 75, whereupon the filter may be extracted from the available end of the tube 20 and cleaned or replaced, as required. The plate 162 at the other side of the brackets 22 may be readily removed to reach the junction box which may be provided adjacent thereto or mounted in connection therewith. The ease that this will lend in maintenance procedures, in addition to the foregoing features, should be readily apparent.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A portable heater comprising a housing composed of separate parts including a lower part having a bottom and side wall portions defining a trough, components of said heater including a combustion chamber assembly and a support, said support positioning in a sense transverse to said lower part, said combustion chamber assembly and said support having in connection therewith means for seating to and interfitting with means in connection with said side wall portions of said lower part in a drop fit thereof to said lower part, said support mounting thereon a motor and a fan blade assembly for powering said heater and developing therein a pressured flow of air to and about said combustion chamber assembly and means for delivering fuel and igniting the fuel in delivery thereof to the combustion chamber of said assembly, said interfitting means being constructed and arranged to position said combustion chamber assembly and said support and said fan blade assembly in a substantially direct alignment on and within said lower part of said housing and to inhibit relative longitudinal and lateral motion therebetween.

2. A portable heater as in claim 1 wherein said means in connection with said side wall portions include flange-like surface portions and said interfitting means include portions of said combustion chamber assembly and said support which are constructed and arranged to bear on said flange-like surface portions and to have a controlling interengagement therewith which inhibits relative longitudinal and lateral motion therebetween without the aid of fasteners.

3. A portable heater as in claim 1 wherein said means in connection with said side wall portions of said lower part include lateral and outwardly directed projections and said interfitting means include portions of hook-like configuration.

4. A portable heater as in claim 1 wherein said means in connection with said side wall portions of said lower part include flange elements having longitudinally spaced notches and said combustion chamber assembly and said support include hook-like lateral extensions which engage in said notches to provide said interfitting means.

5. A portable heater as in claim 1 wherein said combustion chamber assembly has its interfitting means in the form of longitudinally and laterally spaced brackets which bear on and over portions of said means in connection with said side wall portions of said lower part of said housing and said support is a strap-like device which seats in bridging relation to said trough to the rear of said combustion chamber assembly and has the interfitting means thereof formed as hook-like projections accommodated in openings in said means in connection with said side wall portions of said lower part of said housing.

6. A portable heater as in any one of the preceding claims wherein the remainder of said parts of said housing define a cover for said lower part and the heater components which mount thereto and therein and said cover includes means superposing over said interfitting means and said means in connection with said side wall portions of said lower part which are releasably interconnected with said means in connection with said side wall portions to fix said combustion chamber assembly, said support and the motor and fan blade assembly which mount on said support in the relative position thereof required for their use.

7. Apparatus as in claim 1 wherein said lower part is capped by the upper part of said housing and said upper part has a shape complementary to said lower part but inverted relative thereto, said means in connection with said side wall portions of said lower part are longitudinally extending laterally directed flange portions serving as a base on which said interfitting means bear and said upper part of said housing includes longitudinally extending flanges which are laterally directed and superposed on said interfitting means and the flanges on said lower part and have releasable means in engagement therewith and anchoring to said flanges on said lower part of clamp said interfitting means therebetween.

8. A portable heater as in claim 7 wherein said flange portions on said lower part of said housing are interrupted to form notches therein the depth of which are less than the width of said flange portions and said interfitting means in connection with said combustion chamber assembly and said support include hook-like extensions which drop fit in said notches on the assembly and mount of said combustion chamber assembly and said support to said lower part of said housing.

9. A portable heater as in claim 1 including a shroud, said shroud laterally mounting by seating lateral portions thereof to means in connection with said side wall portions of said lower part of said housing, said shroud closely encircling said fan blade assembly and extending forwardly therefrom to said combustion chamber assembly to form therewith an air flow control chamber having said fan blade assembly adjacent one end constituting its inlet end and the inlet end of said combustion chamber assembly adjacent its opposite end which constitutes its outlet end, the arrangement providing limited outlets at the outlet end of said chamber and that as said fan blade assembly rotates a head of pressure is built up in said air flow control chamber producing a generally uniform pressured flow of air therefrom, by way of said limited outlets, to and about said combustion chamber assembly and components thereof to control the level of combustion of fuel therein and the heat flow therefrom.

10. A portable heater as in claim 9 wherein said means in connection with said side wall portions of said lower part of said housing are commonly formed as parts of co-planar flanges extending longitudinally of said lower part at the lateral extremities of said trough and said interfitting means are fixed to said flanges merely by the application of the upper part of said housing over said lower part and a connection of said upper part to said co-planar flanges.

11. A portable heater as in claim 9 wherein said shroud is a tubular shell the outlet end of which closely encircles the inlet end of said combustion chamber assembly to form therewith a restricted annular orifice for providing a generally uniform skin-like flow of air from said air flow control chamber on operation of said fan blade assembly which moves along and in encompassing relation to the outer peripheral surface of said combustion chamber assembly.

12. A portable heater as in claim 11 wherein said outlet end of said shroud has an internal flange the inner edge of which defines the outer edge of said orifice.

13. A portable heater as in claim 12 wherein said combustion chamber assembly includes an outer tubular shell and in closely spaced concentric relation thereto an inner shell defining the peripheral wall of the combustion chamber and the construction of said air flow control chamber provides for a portion of the air therein to uniformly move therefrom to and through the limited outlet defined by the space between said inner and outer shells, under generally uniform pressure.

14. A portable space heater as in claim 13 wherein said inlet end of said combustion chamber assembly includes an opening to the combustion chamber thereof to which is applied a burner head and the discharge end of a fuel discharge nozzle, and a limited outlet from said air flow control chamber to said combustion chamber is provided by way of said burner head and about said nozzle whereby air is supplied to said combustion chamber under controlled pressure by way of the head of pressure in said air flow chamber.

15. A portable heater as in claim 2 including a shroud immediately encompassing said fan blade assembly extending to and about an end portion of said combustion chamber assembly which is in adjacent aligned relation to said fan blade assembly, said shroud having a cylindrical configuration and a medial horizontal split, the adjacent longitudinally extending edges of the shroud at the split thereof including external flange portions which superpose and seat to said flange-like surface portions of said lower part of said housing commonly with said interfitting means, said fan blade assembly, said end portions of said combustion chamber assembly and said shroud defining a chamber within which said fan blade assembly, when energized, builds up a head of pressure, from which chamber there are limited flow control outlets to supply uniformly controlled amounts of air to and about the components of said combustion chamber assembly.

16. A portable space heater as in claim 15 wherein said external flange portions on the lower portion of said shroud include notches through which project extensions of the upper portion of said split shroud which frictionally adhere to the body of its lower portion as said external flange portions of said shroud superpose.

17. A portable heater as in claim 1 or claim 7 wherein said support is a strap-like object the configuration of which in a sense transversely of said trough in which it nests provides therein a concavely configured pocket, said motor unit being applied to said strap within said pocket and being secured thereto at points laterally centered and spaced longitudinally of the pocket base, the construction and arrangement of which provides means for damping vibrational effects on operation of said motor.

18. A portable heater as in claim 1 or claim 7 wherein said support is a strap-like object the configuration of which in a sense transversely of said trough in which it nests provides therein a concavely configured pocket, said motor unit being applied to said strap within said pocket and being secured thereto at points laterally centered and spaced longitudinally of the pocket base, the construction and arrangement of which provides means for damping vibrational effects on operation of said motor and said base of said pocket embodies resilient projections encountering opposite side portions of said motor to laterally dampen torsional influences on operation of said motor.

19. A portable heater as in claim 1 wherein said support is a resilient strap which when viewed in its transverse disposition has centrally thereof a depression the side walls of which are downwardly convergent and are bridged at their lower limits by a portion of said strap defining the base of said depression from which there is a central upwardly directed offset to which said motor is connected, said offset including means to balance and dampen vibrational influences occurring in the operation of said motor and lateral extremities of said strap providing suspension means for the motor connected with the base of said pocket and embodying at their extremities said interfitting means which connect to said side wall portions of said lower part of said housing on a drop fit thereto of said support.

20. A portable heater as in claim 19 wherein said offset has slip fit therein resilient bumper devices which laterally balance said motor against unbalance and vibration during the operation thereof.

21. A portable heater as in claim 19 or claim 20 wherein said depression has a width substantially less than the width of said trough in said lower part of said housing and said strap includes portions extending oppositely from the remote upper extremites of the side walls of said depression to provide resilient suspension arms supporting the portion of said strap defining said depression, the extremities of which arms are formed to provide hooks constituting said interfitting means of said support.

22. A portable heater as in claim 9 or claim 15 wherein said support is a strap-like object the configuration of which in a sense transversely of said trough in which it nests provides therein a concavely configured pocket, said motor unit being applied to said strap within said pocket and being secured thereto at points laterally centered and spaced longitudinally of the pocket base, the construction and arrangement of which provides means for damping vibrational effects on operation of said motor.

23. A portable heater as in claim 9 or claim 15 wherein said support is a strap-like object the configuration of which in a sense transversely of said trough in which it nests provides therein a concavely configured pocket, said motor unit being applied to said strap within said pocket and being secured thereto at point laterally centered and spaced longitudinally of the pocket base, the construction and arrangement of which provides means for damping vibrational effects on operation of said motor and said base of said pocket embodies resilient projections encountering opposite side portions of said motor to laterally dampen torsional influences on operation of said motor.

24. A portable heater comprising a tubular housing, a combustion chamber assembly mounted within and in connection with said housing, in a spaced relation thereto, said combustion chamber assembly including a tubular shell defining its outer wall surface and a further shell within said tubular shell defining the peripheral wall of a combustion chamber and forming with said tubular shell a limited annular passage about and extending longitudinally of said combustion chamber, said combustion chamber having an inlet thereto and an outlet therefrom, a burner head including a nozzle assembly positioned in communication with said inlet and having in connection therewith means for delivery thereto of fuel for ignition and combustion in said combustion chamber, a motor driven fan blade assembly positioning to the rear of and in spaced, axially aligned relation to said inlet, said combustion chamber assembly and said motor driven fan blade assembly having in connection therewith means for seating to and interfitting with means in connection with said housing in a drop fit thereof to a portion of said housing, said interfitting means being constructed and arranged to position said combustion chamber assembly and said motor driven fan blade assembly in a substantially direct alignment and to inhibit relative longitudinal and lateral motion therebetween, means defining a shroud enveloping said fan blade assembly in closely spaced relation to its outer periphery, said shroud extending from said fan blade assembly to said combustion chamber assembly to define at the combustion chamber assembly an annular orifice communicating with the exterior surface thereof, an air flow control chamber being defined between said fan blade assembly and combustion chamber assembly within said shroud, said control chamber having limited outlets including said annular orifice, the entrance to one end of said annular passage and a third outlet defined by passages defined in said burner head the discharge ends of which communicate with said nozzle and said combustion chamber, the arrangement providing that on energizing of said fan blade assembly, the air flow produced thereby creates a head of pressure in said control chamber resulting in a generally uniformly pressured delivery of air to and about said tubular shell, between said tubular shell and said inner shell and to said combustion chamber whereby to control the temperature of said housing, the heat exchange between said combustion chamber and the air flow in the space thereabout and combustion within said combustion chamber.

25. A portable heater as in claim 24 wherein said shroud includes an internal flange at the end thereof which extends to said combustion chamber assembly and said end of said shroud including said flange is arranged to overlap the outer surface of said combustion chamber assembly and define therewith said orifice, through which air passes from said control chamber in a skin-like flow to move out and over the outer surface of said combustion chamber assembly.

26. A portable heater as in claim 24 including a fuel tank, said housing being mounted on said tank, said tank extending longitudinally and laterally of said housing and forming its base, a fuel supply tube depending into said tank intermediate its ends and adjacent one side thereof, a fuel delivery line extending between said fuel supply tube and said nozzle assembly and releasably coupled thereto, the arrangement facilitating ready access for assembly and maintenance of said fuel supply tube and said tank.

27. A portable heater as in claim 26 wherein said housing is nested in plate-like brackets extending transverse to and spaced longitudinally of the top of said tank, said fuel supply tube is located intermediate and within the bounds of said brackets, and the lateral extremities of said brackets are bridged by plates which hook thereon and seat to the top of said tank, whereby to protectively enclose said fuel supply tube and any other heater accessories within the bounds of said brackets while providing easy and quick access thereto.

28. A portable heater comprising a tubular housing, a combustion chamber assembly mounted within and in connection with said housing, in a spaced relation thereto, said combustion chamber assembly including a tubular shell defining its outer wall surface and a further shell within said tubular shell defining the peripheral wall of a combustion chamber and forming with said tubular shell a limited annular air passage about and extending longitudinally of said combustion chamber, said combustion chamber having an inlet thereto and an outlet therefrom, a burner head including a nozzle assembly positioned in communication with said inlet and having in connection therewith means for delivery thereto of fuel for ignition and combustion in said combustion chamber, a motor driven fan blade assembly positioning to the rear of and in spaced axially aligned relation to said inlet, means defining a shroud enveloping said fan blade assembly in a closely spaced relation to its outer periphery, said shroud extending from said fan blade assembly to said combustion chamber assembly, said shroud including an internal flange at the end thereof which extends to said combustion chamber assembly, said flange being arranged to overlap the outer surface of said combustion chamber assembly to define therewith an annular orifice, an air flow control chamber being defined between said fan blade assembly and said combustion chamber assembly within said shroud, said control chamber having limited outlets including said annular orifice, the entrance to one end of said annular passage, and a third outlet defined by passages in said burner head the discharge ends of which communicate with said nozzle and said combustion chamber, said shroud being medially split into two parts in a longitudinal plane thereof and including in connection with one part thereof extensions which fit over body portions of the other part to provide a frictional connection therebetween, said shroud having portions which provide a mount thereof to and for a connection thereof with said housing, the arrangement providing that on energizing of said fan blade assembly, the air flow produced thereby creates a head of pressure in said control chamber and a generally uniformly pressured delivery of air to and about said tubular shell in a skin-like flow to move out and over the outer surface of said combustion chamber assembly, a similar delivery of air between said tubular shell and said further shell and to said combustion chamber, whereby to control the temperature of said housing, the heat exchange between said combustion chamber and the air flow in the space thereabout and combustion within said combustion chamber.

29. A portable heater as in claim 28 wherein each of said two parts of said shroud is of generally hemi-cylindrical cross sectional configuration and said parts each include in the diametral plane thereof laterally projected flanges which superpose and provide for the connection thereof to said housing, and the flanges of one said shroud part includes laterally aligned notches accommodating said extensions which form part of the other of said shroud parts, thereby to inhibit the relative longitudinal displacement of said shroud parts on their assembly, and said laterally projected flanges have a drop fit relation to a portion of said housing and means in connection therewith, which establish the position of said shroud and inhibit the longitudinal movement thereof relative to said housing.

* * * * *

UNITED STATES PATENT AND TRADEMARK OFFICE
CERTIFICATE OF CORRECTION

PATENT NO. : 4,313,417
DATED : February 2, 1982
INVENTOR(S) : Eugene C. Briggs and Robert F. Shaftner It is certified that error appears in the above-identified patent and that said Letters Patent are hereby corrected as shown below:

Col. 2, line 6, "so" (second occurrence) is corrected to read -- as -- .

Col. 3, line 8, "depression" is corrected to read -- depressions --.

Col. 8, line 11, "other wise" is corrected to read -- otherwise --;

line 15, "heating" is corrected to read -- heater --.

Col. 10, line 21, "perserve" is corrected to read -- preserve --

Col. 12, line 31 (Claim 7, line 13), "of" is corrected to read -- to --.

Col. 14, line 35 (Claim 21, line 5) "extremites" is corrected to read -- extremities --;

line 56 (Claim 23, line 6), "point" is corrected to read -- points --.

Signed and Sealed this

Fourth Day of May 1982

[SEAL]

Attest:

GERALD J. MOSSINGHOFF

*Attesting Officer*     *Commissioner of Patents and Trademarks*